(12) United States Patent
Akahira et al.

(10) Patent No.: US 8,988,698 B2
(45) Date of Patent: Mar. 24, 2015

(54) IMAGE FORMING APPARATUS, IMAGE FORMING METHOD, AND STORAGE MEDIUM

(75) Inventors: Shinji Akahira, Kanagawa (JP); Toru Osamura, Kanagawa (JP); Yoshiharu Yoshida, Kanagawa (JP); Daigo Yamagishi, Kanagawa (JP); Naoya Konita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 63 days.

(21) Appl. No.: 13/469,292

(22) Filed: May 11, 2012

(65) Prior Publication Data

US 2013/0050736 A1    Feb. 28, 2013

(30) Foreign Application Priority Data

Aug. 25, 2011    (JP) .................................. 2011-183229

(51) Int. Cl.
*G06F 15/00*    (2006.01)
*G03G 15/00*    (2006.01)
*H04N 1/00*    (2006.01)
*H04N 1/44*    (2006.01)

(52) U.S. Cl.
CPC ............ *G03G 15/50* (2013.01); *G03G 15/5016* (2013.01); *H04N 1/00037* (2013.01); *H04N 1/00082* (2013.01); *H04N 1/4413* (2013.01); *H04N 2201/0094* (2013.01); *H04N 2201/0091* (2013.01)
USPC ........................................................ 358/1.14

(58) Field of Classification Search
USPC ........................................................ 358/1.14
See application file for complete search history.

(56) References Cited

U.S. PATENT DOCUMENTS

2008/0192289 A1* 8/2008 Honda et al. .................. 358/1.15
2010/0220349 A1* 9/2010 Ogura et al. .................. 358/1.14

FOREIGN PATENT DOCUMENTS

JP            9-292802 A    11/1997

* cited by examiner

*Primary Examiner* — Saeid Ebrahimi Dehkordy
(74) *Attorney, Agent, or Firm* — Sughrue Mion, PLLC (57) ABSTRACT

An image forming apparatus includes an authenticating unit that compares input identification information of a user with user information containing identification information of users and authenticates a user corresponding to the input identification information of the user; a detecting unit that detects that the authenticated user leaves the image forming apparatus; and a clearing unit that clears the authenticated state of the authenticated user if the detecting unit detects that the authenticated user leaves the image forming apparatus.

8 Claims, 10 Drawing Sheets

■ PROCESSING METHOD OF SUSPENDED JOB
(WHEN AUTHENTICATED USER UNLOCKS)

☒ CONTINUE JOB

☐ CANCEL JOB

[SET] [CANCEL]

FIG. 8B

■ PROCESSING METHOD OF SUSPENDED JOB
(WHEN OTHER USER UNLOCKS)

☒ SAVE JOB

☐ CANCEL JOB

[SET] [CANCEL]

IMAGE FORMING APPARATUS, IMAGE FORMING METHOD, AND STORAGE MEDIUM

CROSS-REFERENCE TO RELATED APPLICATIONS

This application is based on and claims priority under 35 USC 119 from Japanese Patent Application No. 2011-183229 filed Aug. 25, 2011.

BACKGROUND

The present invention relates to an image forming apparatus, an image forming method, and a storage medium.

SUMMARY

According to an aspect of the invention, there is provided an image forming apparatus including an authenticating unit that compares input identification information of a user with user information containing identification information of users and authenticates a user corresponding to the input identification information of the user; a detecting unit that detects that the authenticated user leaves the image forming apparatus; and a clearing unit that clears the authenticated state of the authenticated user if the detecting unit detects that the authenticated user leaves the image forming apparatus.

BRIEF DESCRIPTION OF THE DRAWINGS

An exemplary embodiment of the present invention will be described in detail based on the following figures, wherein.

DETAILED DESCRIPTION

An exemplary embodiment of the present invention is described below with reference to the figures.

Figure 1:
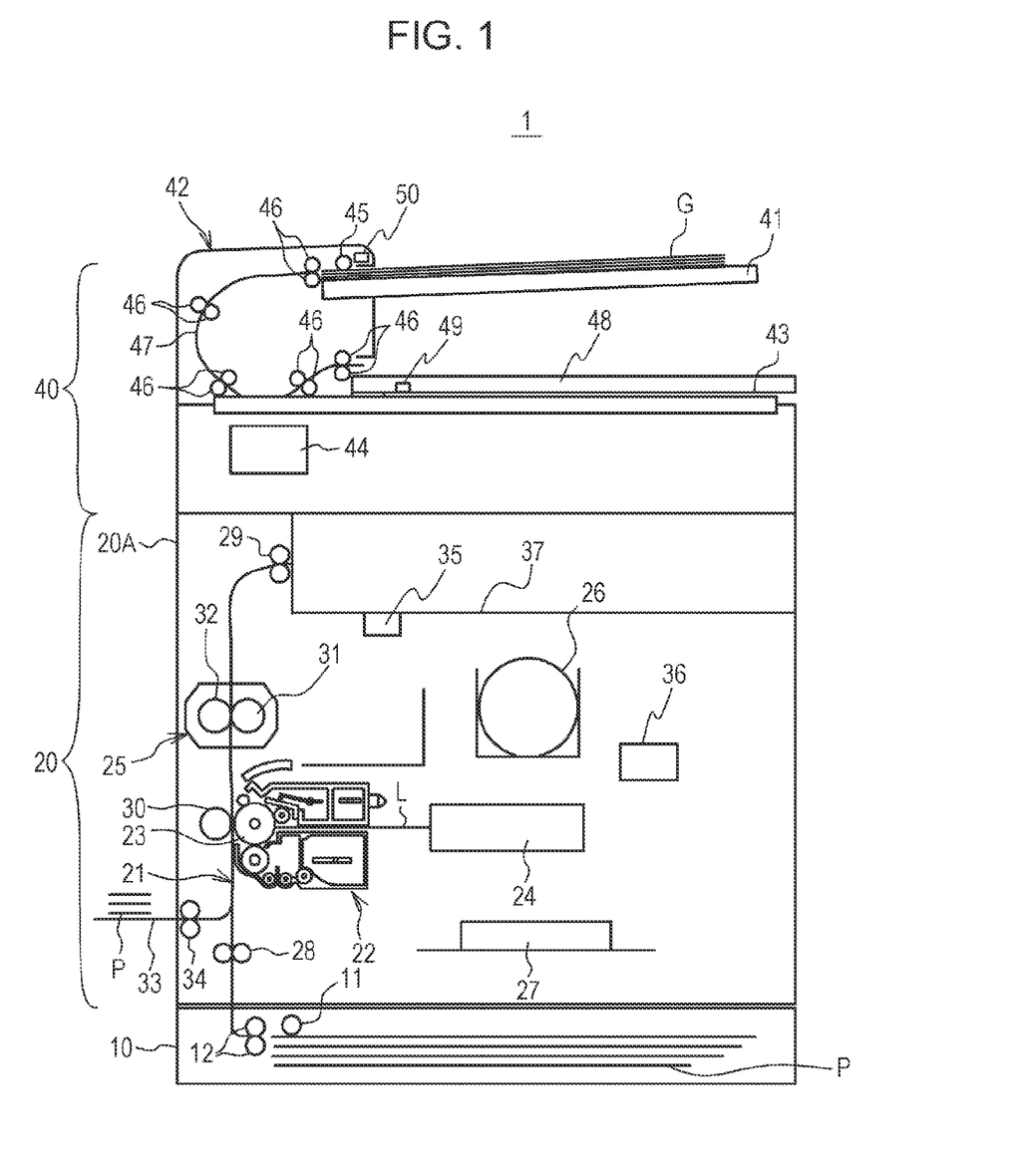
FIG. 1 is a configuration diagram of an image forming apparatus according to an exemplary embodiment.

FIG. 1 is a configuration diagram of an image forming apparatus 1 according to an exemplary embodiment.

The image forming apparatus 1 is, for example, a copier or a multifunction apparatus. The image forming apparatus 1 includes a cassette 10 that houses sheets P, an image forming unit 20 that is provided above the cassette 10 and performs image formation on the sheets P fed from the cassette 10, and a document reading unit 40 that is provided above the image forming unit 20 and reads a document G.

The cassette 10 is provided with a sending roller 11 that sends the sheets P to a transport path 21 provided in the image forming apparatus 1. Also, a pair of transport rollers 12 is provided downstream of the sending roller 11 in the transport path 21 and transports the sheets P one by one. It is to be noted that the transport path 21 is provided in the image forming apparatus 1 such that the lower side in FIG. 1 is the upstream side and the upper side in FIG. 1 is the downstream side.

The image forming unit 20 includes a housing 20A, a developing unit 22 that faces the transport path 21 in the housing 20A and forms a toner image (a developer image) on a sheet P, an exposure unit 24 that forms an electrostatic latent image on a photoconductor 23 of the developing unit 22, a fixing unit 25 that fixes the toner image onto the sheet P, a toner cartridge 26 that houses a black toner that is fed to the developing unit 22, a controller 27 that controls operations of respective units of the image forming apparatus 1, and a human sensor 36 that detects presence of a person in front of the image forming apparatus 1. The human sensor 36, for example, detects infrared radiation generated from a human body, and hence detects that a person is close to the image forming apparatus 1.

The human sensor 36 may detect that a person enters a space where the human sensor 36 can perform sensing or that a person leaves the space.

Alternatively, the human sensor 36 may detect that a person is present in a space where the human sensor 36 can perform sensing or that a person is not present in the space.

A pair of registration rollers 28 is provided in an upstream portion of the transport path 21. The registration rollers 28 temporarily stop the sheet P, and send the sheet P to the developing unit 22 at a predetermined timing. Also, a pair of output rollers 29 is provided in a downstream portion of the transport path 21. The output rollers 29 output the sheet P with the toner image fixed thereto. The sheet P with the toner image fixed thereto is output to an output tray 37. The output tray 37 is provided with a sheet sensor 35 that detects presence of the sheet P with the toner image fixed thereto.

Also, a transfer roller 30 is provided at a position to face the outer peripheral surface of the photoconductor 23 with the transport path 21 arranged therebetween. A voltage with a reversed polarity with respect to a polarity (for example, minus polarity) of the toner is applied to the transfer roller 30. The inside of the photoconductor 23 is grounded and the reversed polarity with respect to the polarity (for example, minus polarity) of the toner is applied to the transfer roller 30. Hence, a potential difference is generated between the outer peripheral surface of the photoconductor 23 and the transfer roller 30. Because of this potential difference (an electric field), the toner image that is present on the outer peripheral surface of the photoconductor 23 after the development is transferred on the sheet P.

The fixing unit 25 includes a heat roller 31 having a heater therein, and a pressure roller 32 that faces the outer peripheral surface of the heat roller 31 and presses the sheet P against the heat roller 31. The fixing unit 25 applies heat and pressure to the sheet P by pinching the sheet P between the heat roller 31 and the pressure roller 32, thereby fixing the toner image onto the sheet P.

Also, the image forming apparatus 1 includes a tray 33 that manually feeds sheets P, and a pair of transport rollers 34 that transports the sheets P one by one.

The document reading unit 40 includes a document transport device 42 that automatically transport documents G placed on a document tray 41 one by one, a platen glass 43 that is arranged below the document transport device 42 and receives a single document G thereon, and a document reading device 44 that is movably provided below the platen glass 43 and reads the document G on the platen glass 43.

The document transport device 42 includes a cover 48 that presses the document G on the platen glass 43, and a document sensor 49 that detects the document G on the platen glass 43. Also, the document transport device 42 includes a sending roller 45 that sends the documents G one by one, an automatic transport path 47 in which plural pairs of transport rollers 46 are arranged, and a document sensor 50 that detects the document G on the document tray 41. Part of the automatic transport path 47 is arranged so that the document G is transported on the platen glass 43. Also, the document reading device 44 reads the document G transported by the document transport device 42 while the document reading device 44 is stopped at a position below a left end portion of the platen glass 43, or reads the document G on the platen glass 43 while the document reading device 44 moves rightward.

Figure 2:
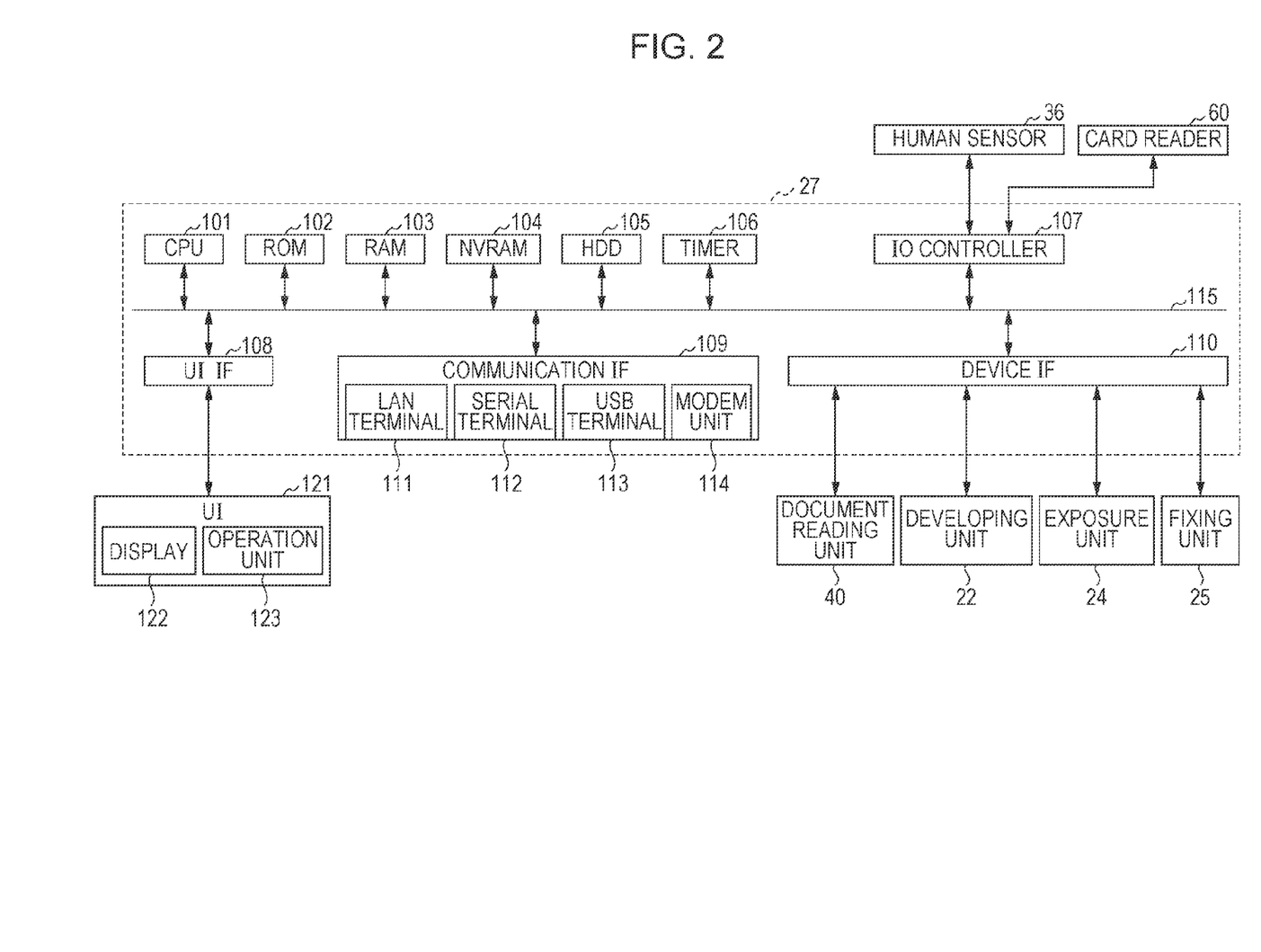
FIG. 2 is a schematic configuration diagram of a controller.

FIG. 2 is a schematic configuration diagram of the controller 27.

The controller 27 includes a central processing unit (CPU) 101 that controls the entire operation of the image forming apparatus 1, a read only memory (ROM) 102 that stores control program for controlling the operation of the image forming apparatus 1, and a random access memory (RAM) 103 that functions as a working space, a non-volatile RAM (NVRAM) 104 that stores various setting information, a suspended job, and a not-started job, a hard disk drive (HDD) 105 that saves image data, information relating to a registered user, various setting information, a suspended job, and a not-started job, a timer 106 that measures an elapsed time since processing of a job is started, an elapsed time since an input function of a UI 121 (described later) is locked, and an elapsed time since setting information, a suspended job, or a not-started job is saved, and an IO controller 107 that controls input/output of a signal to/from the human sensor 36 or a card reader 60. The CPU 101 functions as an authenticating unit, a clearing unit, a processing unit, a locking unit, a saving unit, an unlocking unit, and a notifying unit. The human sensor 36 and the CPU 101 function as a detecting unit.

Also, the controller 27 includes a UI interface (IF) 108 that performs panel control and key control of the user interface (UI) 121, a communication interface (IF) 109 for connection with various external devices or a network, and a device interface (IF) 110 for connection with various sensors. The CPU 101 is connected with the ROM 102, the RAM 103, the NVRAM 104, the HDD 105, the timer 106, the IO controller 107, the UI IF 108, the communication IF 109, and the device IF 110 through a bus 115.

The timer 106 may be installed in the CPU 101 as a timer of software. Also, the timer 106 notifies the CPU 101 of a measurement time.

The UI 121 includes a display 122 formed of a liquid crystal screen, and an operation unit 123 formed of a start button, a stop button, numeric keys, etc. If the display 122 is formed of a touch panel, the display 122 includes the operation unit 123. That is, the display 122 receives an input operation while displaying an operation screen. The UI 121 functions as a setting unit and a display.

The communication IF 109 includes a LAN terminal 111 that may be connected with a LAN cable of 10/100 BASE-T or a communication unit of wireless LAN, a serial terminal 112 that may be connected with any of various peripheral devices through a serial cable, a USB terminal 113 that may be connected with a USB device through a USB cable, and a modem unit 114 that performs facsimile communication or telephone communication. The LAN terminal 111 and the modem unit 114 function as a notifying unit.

The IO controller 107 is connected with the human sensor 36 and the card reader 60. The device IF 110 is connected with the document reading unit 40, the developing unit 22, the exposure unit 24, and the fixing unit 25.

The CPU 101 performs user authentication based on user information previously registered in the HDD 105, and a user ID and a password input with the UI 121. For example, the user information previously registered in the HDD 105 includes a user ID, a password, and attribute information. The user ID and the password function as identification information of a user. The user ID and the password may be input through the UI 121. Alternatively, for example, the user ID and the password may be input such that the card reader 60 reads an authentication card (for example, an ID card or an IC card) having the user ID and the password. Also, the user information may be registered in the NVRAM 104 instead of the HDD 105.

Figure 3:
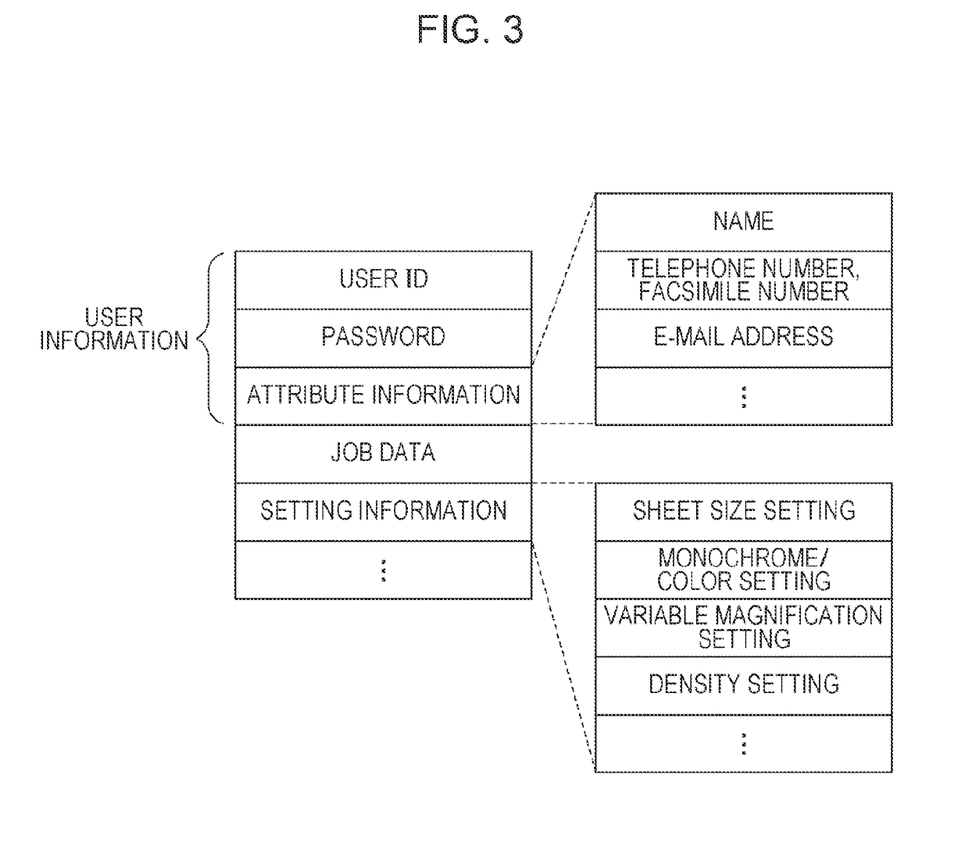
FIG. 3 illustrates a structure of save data saved in a HDD or a NVRAM.

FIG. 3 illustrates a structure of save data saved in the HDD 105 or the NVRAM 104.

Save data saved in the HDD 105 or the NVRAM 104 is user information, job data, setting information, etc. The job data and the setting information are saved when an authenticated state of a user (a state in which user authentication is successful) is cleared and an authentication operation for another user is performed, or when the authenticated state of the user is automatically cleared after a predetermined time elapses. Also, as shown in FIG. 3, the job data and the setting information are saved in association with the user information.

The user information contains a user ID, a password, and attribute information. The attribute information contains a name of a user, a telephone number and a facsimile number as addresses of the user, and an e-mail address as an address of the user.

Figure 4:
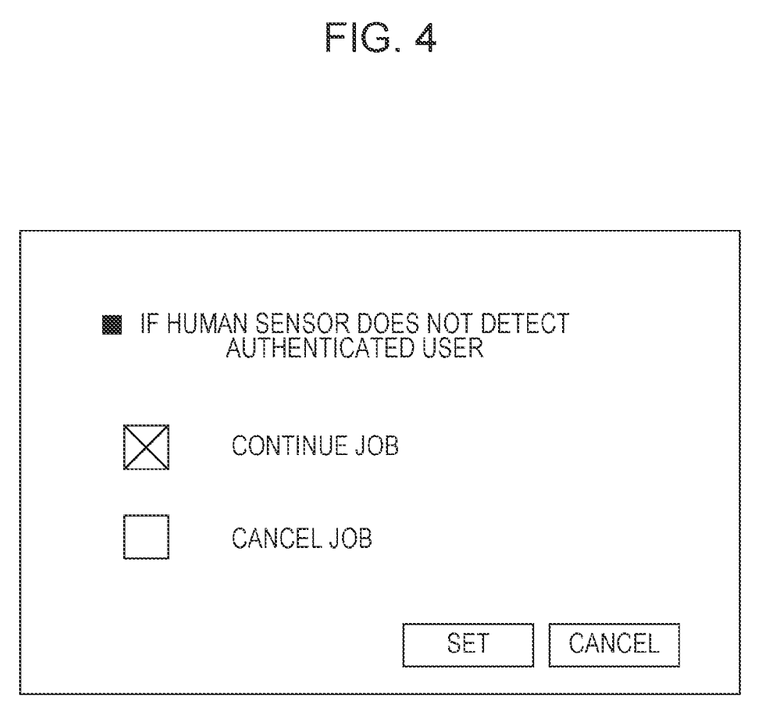
FIG. 4 illustrates an example setting screen for setting a method of processing a job that is currently executed if a human sensor does not detect an authenticated user.

The setting information is information set by a user for processing a job, and contains sheet size setting, monochrome/color setting, variable magnification setting, density setting, etc. Also, the setting information contains setting relating to a method of processing a job that is currently executed if the human sensor 36 does not detect an authenticated user. For example, the setting information contains setting indicative of whether the currently executed job is continued, saved, or canceled (deleted). FIG. 4 illustrates an example setting screen for setting a method of processing a job that is currently executed if the human sensor 36 does not detect the authenticated user. In this case, whether the currently executed job is continued or canceled is set for every user or every job. Accordingly, even if the authenticated user leaves the image forming apparatus 1, the job is processed by a processing method desired by the user.

Figure 5:
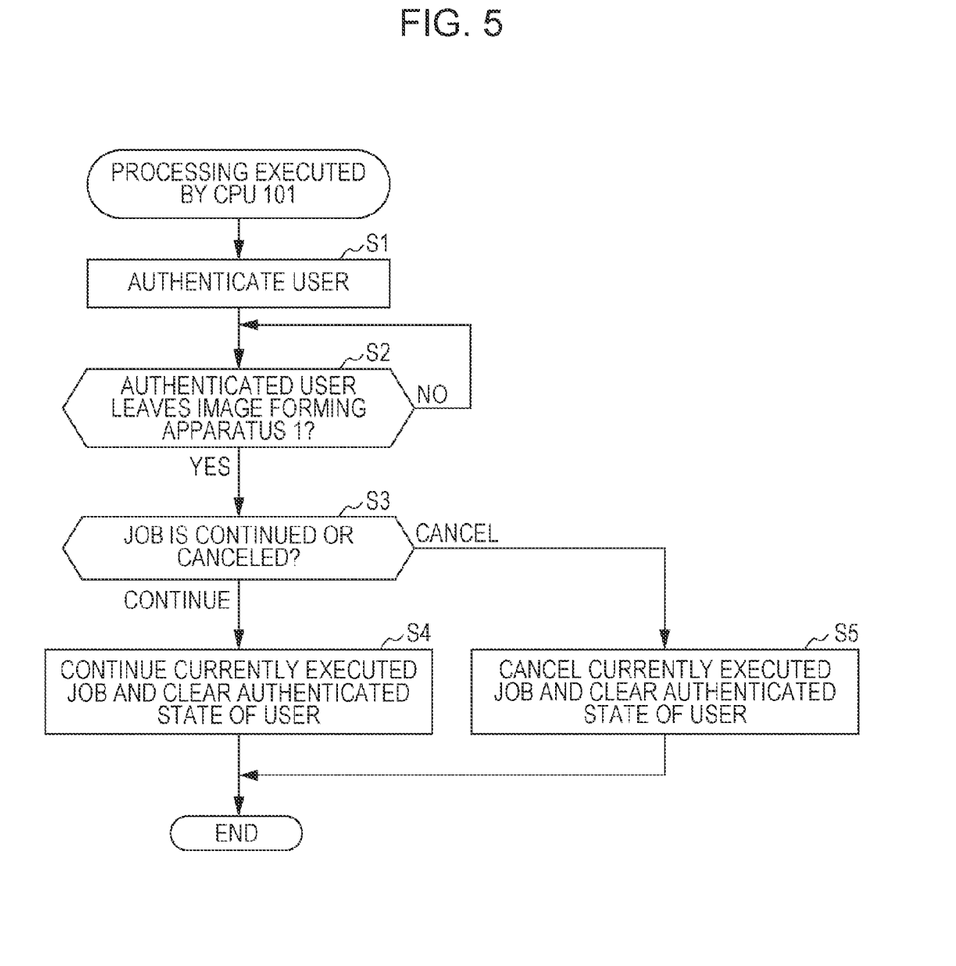
FIG. 5 is a flowchart showing processing executed by a CPU.

FIG. 5 is a flowchart showing processing executed by the CPU 101.

The CPU 101 performs user authentication based on the user information previously registered in the HDD 105, and the user ID and the password input with the UI 121 or the authentication card (step S1).

In the authenticated state, the CPU 101 determines whether or not the authenticated user leaves the image forming apparatus 1 based on the detection signal of the human sensor 36 (step S2). If NO in step S2, the determination is repeated. In contrast, if YES in step S2, the CPU 101 determines whether the setting relating to the method of processing the currently executed job is setting of continuing the currently executed job or setting of canceling the job (step S3).

If the setting relating to the method of processing the currently executed job is the setting of continuing the currently executed job in step S3, the CPU 101 continues the currently executed job and clears the authenticated state of the user, that is, logs out the user (step S4).

In contrast, if the setting relating to the method of processing the currently executed job is the setting of canceling the currently executed job in step S3, the CPU 101 cancels the currently executed job and clears the authenticated state of the user, that is, logs out the user (step S5).

Figure 6:
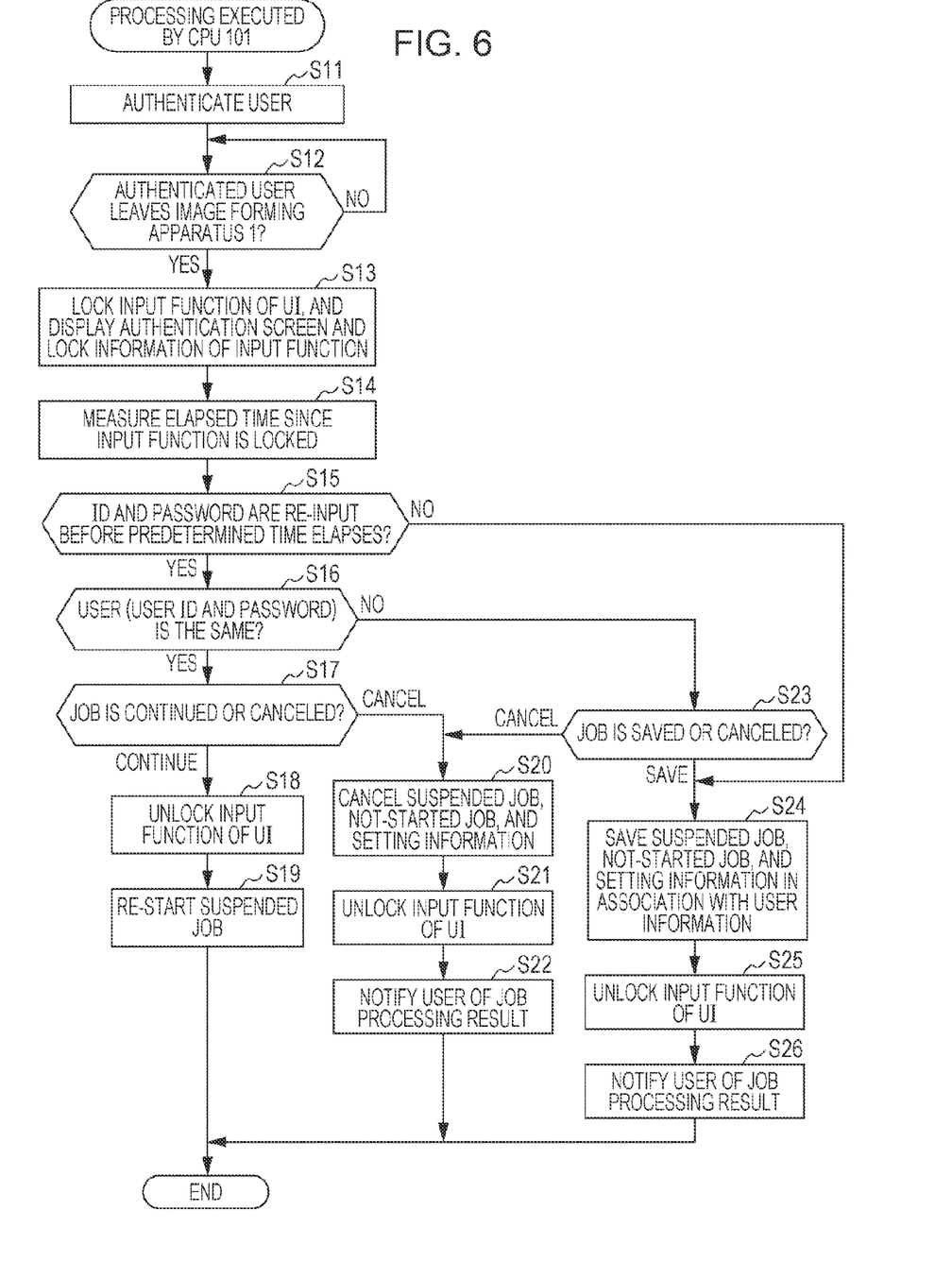
FIG. 6 is a flowchart showing a modification of the processing executed by the CPU.

FIG. 6 is a flowchart showing a modification of the processing executed by the CPU 101.

The CPU 101 performs user authentication based on the user information previously registered in the HDD 105, and the user ID and the password input with the UI 121 or the authentication card (step S11).

Figure 7:
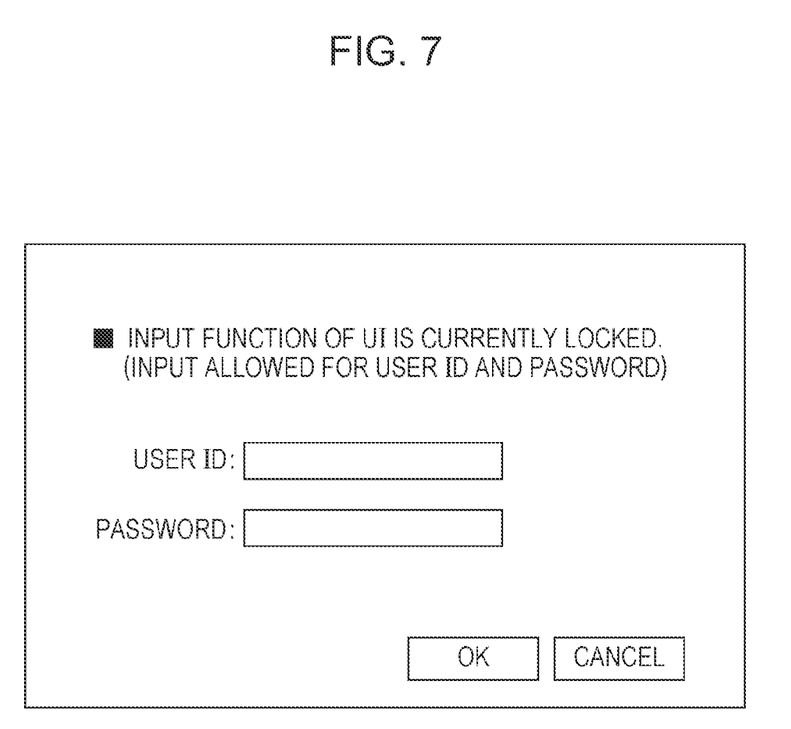
FIG. 7 illustrates an example display screen of a UI if an input function of the UI is locked.

In the authenticated state, the CPU 101 determines whether or not the authenticated user leaves the image forming apparatus 1 based on the detection signal of the human sensor 36 (step S12). If NO in step S12, the determination is repeated. In contrast, if YES in step S12, the CPU 101 locks an input function of the operation unit 123 of the UI 121 so that only input of a user ID and a password is allowed to be received while the current authenticated state is maintained, and displays an authentication screen for receiving input of the user ID and the password, and information indicative of that the input function is locked (step S13). At this time, the CPU 101 holds the setting information set for processing the job, a currently processed job, and a not-started job in a state without change, i.e., suspends the currently processed job. FIG. 7 illustrates an example display screen of the UI 121 if the input function of the UI 121 is locked.

Then, the CPU 101 causes the timer 106 to measure an elapsed time since the input function of the UI 121 is locked (step S14). The CPU 101 determines whether or not a user ID and a password are re-input on the authentication screen before a predetermined time (for example, five minutes) elapses (step S15).

If the user ID and the password are re-input in step S15 (YES), the CPU 101 determines whether or not the re-input user ID and password with the UI 121 or the authentication card are the same as the user ID and the password input in step S11 (step S16). In this case, the CPU 101 determines whether or not the user who re-input the user ID and the password is the same as the user when the input function of the UI 121 is locked.

Figure 8A:
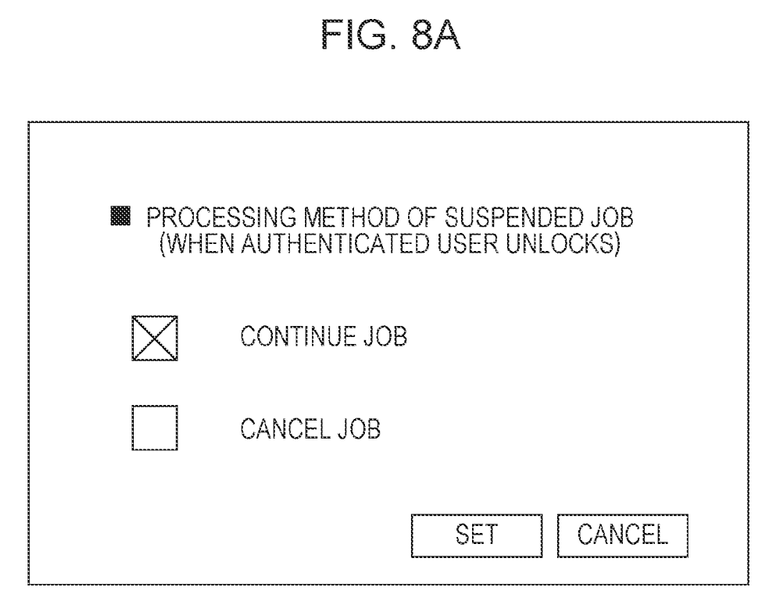
FIGS. 8A and 8B illustrate example setting screens for setting processing methods of a suspended job.

If the user ID and the password re-input with the UI 121 or the authentication card are the same as the user ID and the password input in step S11 (YES in step S16), the CPU 101 determines whether the setting relating to the method of processing the currently suspended job is setting of continuing the currently suspended job or setting of canceling the job (step S17). It is to be noted that the setting relating to the method of processing the currently suspended job is previously set on a setting screen, which is for setting the method of processing the currently suspended job and which is displayed on the UI 121 as shown in FIG. 8A.

If the setting relating to the method of processing the currently suspended job is the setting of continuing the currently suspended job in step S17, the CPU 101 unlocks the input function of the UI 121 (step S18), and re-starts the suspended job (step S19). At this time, the not-started job and the setting information are held.

In contrast, if the setting relating to the method of processing the currently suspended job is the setting of canceling the currently suspended job in step S17, the CPU 101 cancels the suspended job, the not-started job, and the setting information (step S20), and unlocks the input function of the UI 121 (step S21). Further, the CPU 101 notifies the user who requests the suspended job of the processing result for the job and the setting information (in this case, the processing result of canceling the job and the setting information) based on the saved data in FIG. 3 (step S22). Accordingly, the user recognizes the processing result of the job and the setting information. It is to be noted that the notifying method may use any of telephone, facsimile, and e-mail.

Figure 8B:
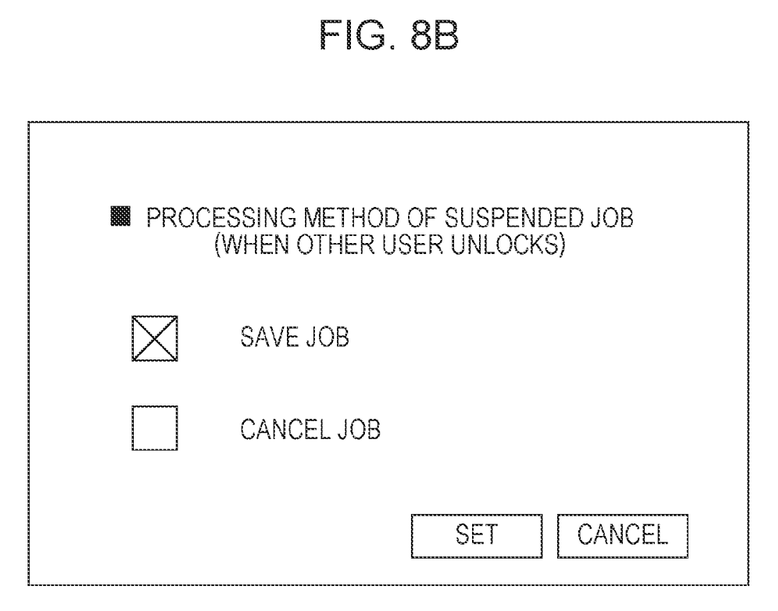

If the user ID and the password re-input with the UI 121 or the authentication card are not the same as the user ID and the password input in step S11 (NO in step S16), the CPU 101 determines whether the setting relating to the method of processing the currently suspended job is setting of saving the currently suspended job or setting of canceling the job (step S23). It is to be noted that the setting relating to the method of processing the currently suspended job is previously set on a setting screen, which is for setting the method of processing the currently suspended job and which is displayed on the UI 121 as shown in FIG. 8B.

If the setting relating to the method of processing the currently suspended job is the setting of saving the currently suspended job (YES in step S23), the CPU 101 saves the suspended job, the not-started job, and the setting information in association with user information of the user who requests the job in the HDD 105 (step S24), and unlocks the input function of the UI 121 (step S25). Further, the CPU 101 notifies the user who requests the suspended job of the processing result for the job and the setting information (in this case, the processing result of saving the job and the setting information) (step S26) based on the saved data in FIG. 3. Accordingly, the user recognizes the processing result of the job and the setting information.

In contrast, if the setting relating to the method of processing the currently suspended job is the setting of canceling the currently suspended job (NO in step S23), the process goes to step S20. If the user ID and the password are not re-input in step S15 (NO), the process goes to step S24. As described above, if the user ID and the password are not re-input on the authentication screen before the predetermined time (for example, five minutes) elapses (NO in step S15), the suspended job, the not-started job, and the setting information are saved in association with the user information of the user who requests the job, and the input function of the UI 121 is unlocked (steps S24 and S25). Hence, an environment, in which a user other than the user who inputs the user ID and the password may use the image forming apparatus 1, is automatically provided.

If the suspended job, the not-started job, and the setting formation are saved in step S24, the CPU 101 saves the suspended job, the not-started job, and the setting information, and then determines whether or not a predetermined time (for example, three days) elapses. If the predetermined time elapses, the suspended job, the not-started job, and the setting information may be canceled. Accordingly, the capacity of the HDD 105 or the NVRAM 104 used for the job and the setting information, which are less likely used, is reduced.

It is to be noted that the order of the processing of steps S18 and S19 is not limited to the above-described exemplary embodiment. That is, the processing of step S19 may be executed before the processing of step S18. Similarly, the order of the processing of steps S20 and S21 is not limited to the above-described exemplary embodiment. The order of the processing of steps S24 and S25 is not limited to the above-described exemplary embodiment.

Figure 9:
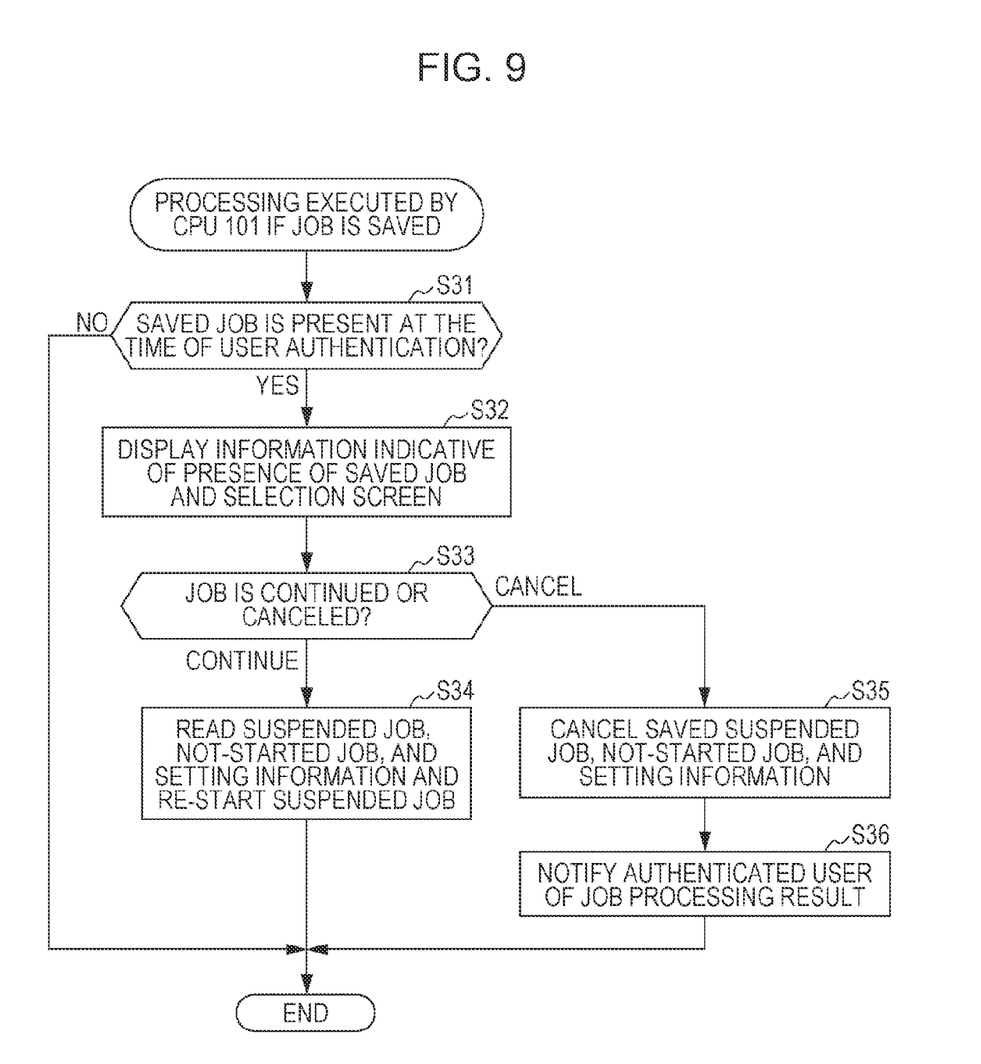
FIG. 9 is a flowchart showing processing executed by the CPU if a suspended job, a not-started job, and setting information are saved.

FIG. 9 is a flowchart showing processing executed by the CPU 101 if the suspended job, the not-started job, and the setting information are saved.

The CPU 101 determines whether or not a saved job corresponding to the input user ID and password is present at the time of user authentication (step S31). More specifically, the CPU 101 determines that a saved job is already present if a job corresponding to an authenticated user is present in the HDD 105 or the NVRAM 104 at the time of user authentication.

Figure 10:
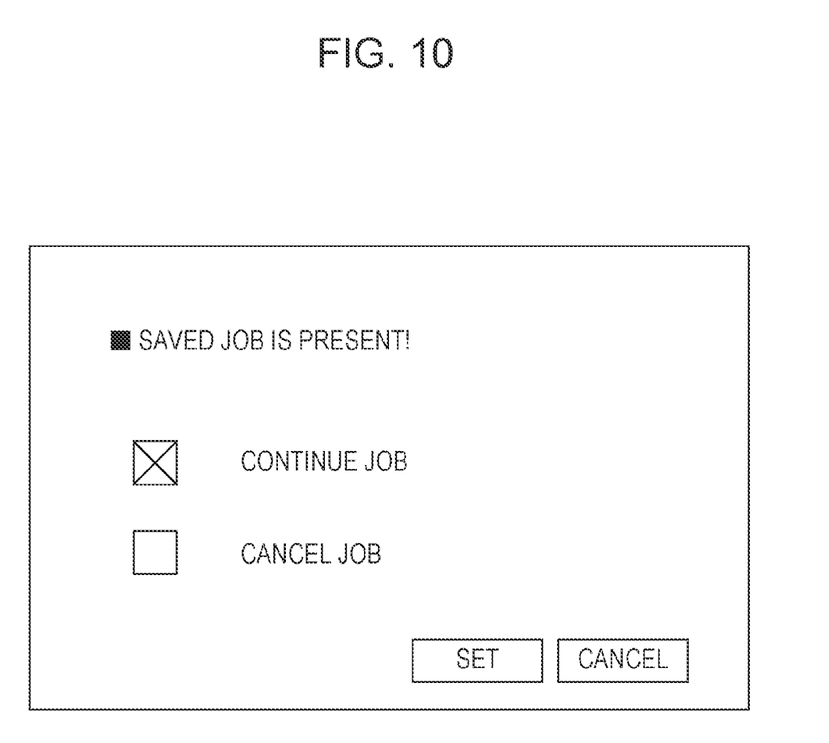
FIG. 10 illustrates an example selection screen.

If the saved job corresponding to the input user ID and password is not present at the time of user authentication (NO in step S31), this processing is ended. If the saved job corresponding to the input user ID and password is present at the time of user authentication (YES in step S31), the CPU 101 causes the UI 121 to display information indicative of that the saved job is present and a selection screen for selecting processing of continuing the job or processing of canceling the job (step S32). For example, FIG. 10 illustrates an example selection screen.

Then, the CPU 101 determines whether the processing of continuing the saved job is selected or the processing of canceling the saved job is selected (step S33). If the processing of continuing the saved job is selected in step S33 (YES), the CPU 101 reads the suspended job, the not-started job, and the setting information from the HDD 105 or the NVRAM 104, and re-starts the suspended job (step S34). If the processing of canceling the saved job is selected in step S33 (NO), the CPU 101 cancels the saved suspended job, not-started job, and setting information (step S35). Further, the CPU 101 notifies the authenticated user of the processing result for the job and the setting information (in this case, the processing result of canceling the job and the setting information) based on the saved data in FIG. 3 (step S36). Accordingly, the user recognizes the processing result of the job and the setting information. It is to be noted that the notifying method may use any of telephone, facsimile, and e-mail. With the processing in FIG. 9, the saved job is processed by the method selected by the user.

As described above, with this exemplary embodiment, the CPU 101 compares input user ID and password of a user with user information containing user IDs and passwords of users, authenticates a user corresponding to the input user ID and password of the user, detects that the authenticated user leaves the image forming apparatus 1 based on the detection signal of the human sensor 36, and if it is detected that the authenticated user leaves the image forming apparatus 1, clears the authenticated state of the authenticated user. Hence, since the CPU 101 clears the authenticated state of the authenticated user if it is detected that the authenticated user leaves the image forming apparatus 1, an opportunity to use the image forming apparatus 1 is ensured for other users, and hence operating efficiency is increased as compared with the image forming apparatus of related art.

The CPU 101 compares input user ID and password of a user with user information containing user IDs and passwords of users, authenticates a user corresponding to the input user ID and the password of the user, detects that the authenticated user leaves the image forming apparatus 1 based on the detection signal of the human sensor 36, and if it is detected that the authenticated user leaves the image forming apparatus 1, locks the input function of the UI 121 so that only input of a user ID and a password is allowed to be received while the authenticated state of the current user is maintained. Then, the UI 121 displays the authentication screen for receiving a user ID and a password, and information indicative of that the input function of the UI 121 is locked. Further, if a user ID and a password re-input on the authentication screen are different from the input user ID and password of the user, the CPU 101 saves a job and setting information set for processing the job in the HDD 105 or the NVRAM 104 in association with the input user ID and password, and unlocks the input function of the UI 121. Accordingly, an opportunity to use the image forming apparatus 1 is ensured for other users, and the operating efficiency is increased as compared with the image forming apparatus of related art. Further, a job requested by a first user is easily re-started.

Even if a storage medium that stores a program of software for realizing the function of the image forming apparatus 1 is supplied to the image forming apparatus 1 and the CPU 101 reads and executes the program stored in the storage medium, an advantage similar to that of the above-described exemplary embodiment is attained. The storage medium for supplying the program may be, for example, a CD-ROM, a DVD, or a SD card. Also, even if the CPU 101 executes the program of software for realizing the function of the image forming apparatus 1, an advantage similar to that of the exemplary embodiment is attained.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an authenticating unit that compares input identification information of a user with user information containing identification information of users and authenticates a user corresponding to the input identification information of the user;
   a detecting unit that detects absence of the authenticated user within a sensing area of the detecting unit;
   a locking unit that locks an input function of an operation unit so that only input of identification information of a user is allowed to be received while the authenticated state of the current user is maintained in response to the detecting unit detecting the absence of the authenticated user within the sensing area;
   a display that displays an authentication screen for receiving identification information of a user and information indicative of that the input function of the operation unit is locked;
   a saving unit that saves a job and setting information set for processing the job in a memory in association with the input identification information of the user if identification information of a user re-input on the authentication screen is different from the input identification information of the user; and
   an unlocking unit that unlocks the input function of the operation unit,
   wherein, after the locking unit locks the input function of the operation unit, if identification information of a user is not re-input on the authentication screen before a predetermined time elapses, the saving unit saves the job and the setting information set for processing the job in the memory in association with the input identification information of the user.

2. The image forming apparatus according to claim 1, wherein, if a saved job corresponding to the input identification information of the user is present at the time of user authentication by the authenticating unit, the display displays information indicative of that the saved job is present and a selection screen for selecting whether the saved job is continued or deleted, and wherein the image forming apparatus further comprises a processing unit that processes the saved job in accordance with selection on the selection screen.

3. The image forming apparatus according to claim 1, wherein, after the job and the setting information are saved, if a predetermined time elapses, the saving unit deletes the job and the setting information.

4. The image forming apparatus according to claim 1, further comprising a notifying unit that, if the job and the setting information are saved or deleted, notifies the authenticated user of information indicative of that the job and the setting information are saved or deleted.

5. A non-transitory computer readable medium storing a program causing a computer to execute a process for forming an image, the process comprising:

comparing input identification information of a user with user information containing identification information of users, and authenticating a user corresponding to the input identification information of the user on an image forming apparatus;

detecting absence of the authenticated user within a sensing area of a sensor of the image forming apparatus;

locking an input function of an operation unit so that only input of identification information of a user is allowed to be received while the authenticated state of the current user is maintained in response to detecting absence of the authenticated user within the sensing area;

displaying an authentication screen for receiving identification information of a user and information indicative of that the input function of the operation unit is locked;

saving a job and setting information set for processing the job in a memory in association with the input identification information of the user if identification information of a user re-input on the authentication screen is different from the input identification information of the user;

after locking the input function of the operation unit, determining that identification information of a user is not re-input on the authentication screen before a predetermined time elapses, and saving the job and the setting information set for processing the job in the memory in association with the input identification information of the user and clearing the authenticated state of the authenticated user.

6. A non-transitory computer readable medium storing a program causing a computer to execute a process for forming an image, the process comprising:

comparing input identification information of a user with user information containing identification information of users, and authenticating a user corresponding to the input identification information of the user on an image forming apparatus;

detecting absence of the authenticated user within a sensing area of a sensor of the image forming apparatus;

locking an input function of an operation unit so that only input of identification information of a user is allowed to be received while the authenticated state of the current user is maintained in response to detecting absence of the authenticated user within the sensing area;

displaying an authentication screen for receiving identification information of a user and information indicative of that the input function of the operation unit is locked;

saving a job and setting information set for processing the job in a memory in association with the input identification information of the user if identification information of a user re-input on the authentication screen is different from the input identification information of the user; and unlocking the input function of the operation unit; and after locking the input function of the operation unit, determining that identification information of a user is not re-input on the authentication screen before a predetermined time elapses, and saving the job and the setting information set for processing the job in the memory in association with the input identification information of the user.

7. An image forming method comprising:

comparing input identification information of a user with user information containing identification information of users, and authenticating a user corresponding to the input identification information of the user on an image forming apparatus;

detecting absence of the authenticated user within a sensing area of a sensor of the image forming apparatus;

locking an input function of an operation unit so that only input of identification information of a user is allowed to be received while the authenticated state of the current user is maintained in response to detecting absence of the authenticated user within the sensing area;

displaying an authentication screen for receiving identification information of a user and information indicative of that the input function of the operation unit is locked;

saving a job and setting information set for processing the job in a memory in association with the input identification information of the user if identification information of a user re-input on the authentication screen is different from the input identification information of the user;

after locking the input function of the operation unit, determining that identification information of a user is not re-input on the authentication screen before a predetermined time elapses, and saving the job and the setting information set for processing the job in the memory in association with the input identification information of the user and clearing the authenticated state of the authenticated user.

8. An image forming apparatus comprising:

an authenticating unit that compares input identification information of a user with identification information of users stored in a storage and authenticates a user corresponding to the input identification information of the user;

a detecting unit that detects absence of a user within a sensing area of the detecting unit;

a receiving unit that receives a processing instructed from the authenticated user;

an execution unit that executes the processing instructed from the authenticated user; and a control unit that, in response to the detecting unit detecting the absence of the user, controls the authenticated state of the current user to be maintained, an input function of the receiving unit to be locked so that reception besides reception of identification information of a user is refused, and the executing processing by the execution unit to be suspended, wherein the control unit, if identification information of a user input again into the receiving unit corresponds with the input identification information of the user, controls the input function of the receiving unit to be unlocked, and the suspended processing to be started again, wherein, after the control unit locks the input function of the receiving unit, if identification information of a user is not re-input before a predetermined time elapses, the control unit saves the processing in the memory in association with the input identification information of the user.

\* \* \* \* \*